United States Patent
Zhen et al.

(10) Patent No.: US 9,848,285 B2
(45) Date of Patent: Dec. 19, 2017

(54) BLUETOOTH COMMUNICATION METHOD AND BLUETOOTH COMMUNICATION DEVICE

(71) Applicant: INTSIG Information Co., Ltd., Shanghai (CN)

(72) Inventors: Lixin Zhen, Shanghai (CN); Lu Cao, Shanghai (CN); Pingxin Li, Shanghai (CN); Renkai Shan, Shanghai (CN)

(73) Assignee: INTSIG INFORMATION CO., Ltd., Shanghai (CN)

( * ) Notice: Subject to any disclaimer, the term of this patent is extended or adjusted under 35 U.S.C. 154(b) by 0 days.

(21) Appl. No.: 14/899,519

(22) PCT Filed: Jun. 26, 2014

(86) PCT No.: PCT/CN2014/080863
§ 371 (c)(1),
(2) Date: Dec. 17, 2015

(87) PCT Pub. No.: WO2014/206321
PCT Pub. Date: Dec. 31, 2014

(65) Prior Publication Data
US 2016/0157047 A1    Jun. 2, 2016

(30) Foreign Application Priority Data
Jun. 26, 2013 (CN) .......................... 2013 1 0259412

(51) Int. Cl.
*H04B 7/00* (2006.01)
*H04W 4/00* (2009.01)
(Continued)

(52) U.S. Cl.
CPC ............. *H04W 4/008* (2013.01); *H04W 8/26* (2013.01); *H04L 61/30* (2013.01); *H04W 8/005* (2013.01); *H04W 84/18* (2013.01)

(58) Field of Classification Search
None
See application file for complete search history.

(56) References Cited

U.S. PATENT DOCUMENTS 6,697,638 B1 * 2/2004 Larsson .............. H04M 1/6091
455/11.1
7,194,238 B2 * 3/2007 Virtanen ............. H04L 29/1216
455/41.2
(Continued)

FOREIGN PATENT DOCUMENTS

CN   1574674 A   2/2005
CN   1635713 A   7/2005
(Continued)

OTHER PUBLICATIONS

The State Intellectual Property Office of People'S Republic of China, First Office Action, Application No. 201310259412.2, Jan. 22, 2015, 24 pages.
(Continued)

*Primary Examiner* — Tuan A Tran

(57) ABSTRACT

A Bluetooth communication method and a device including a Bluetooth module to perform the method are provided. In the method: the device is renamed so that a name of the device includes a character string. The Bluetooth module searches for a second device whose name includes the same character string or a corresponding character string. The Bluetooth module establishes a connection between the device and the second device. The device transmits data with the second device using the established the connection.

20 Claims, 2 Drawing Sheets

(51) Int. Cl.
*H04W 8/26* (2009.01)
*H04L 29/12* (2006.01)
*H04W 8/00* (2009.01)
*H04W 84/18* (2009.01)

(56) References Cited

U.S. PATENT DOCUMENTS

| | | | | |
|---|---|---|---|---|
| 7,778,602 | B2* | 8/2010 | Kim | H04L 12/2805 |
| | | | | 370/349 |
| 8,055,197 | B2* | 11/2011 | Lyu | H04B 17/27 |
| | | | | 455/41.2 |
| 8,126,399 | B1 | 2/2012 | Lee | |
| 8,170,480 | B1* | 5/2012 | Kammer | H04L 63/102 |
| | | | | 455/41.2 |
| 8,583,041 | B2* | 11/2013 | Lee | H04M 1/2745 |
| | | | | 455/41.2 |
| 8,855,562 | B2* | 10/2014 | Rajaraman | H04W 8/005 |
| | | | | 455/41.2 |
| 9,438,718 | B2* | 9/2016 | Davis | H04W 76/00 |
| 9,509,826 | B2* | 11/2016 | Hong | H04M 1/7253 |
| 2004/0180623 | A1 | 9/2004 | Lee et al. | |
| 2005/0232187 | A1 | 10/2005 | Haller et al. | |
| 2006/0031597 | A1 | 2/2006 | Shieh | |
| 2006/0276133 | A1 | 12/2006 | Ly et al. | |
| 2010/0190440 | A1* | 7/2010 | Kim | H04M 1/7253 |
| | | | | 455/41.2 |
| 2011/0143666 | A1* | 6/2011 | Lee | H04M 1/2745 |
| | | | | 455/41.2 |
| 2012/0033245 | A1 | 2/2012 | Kurahashi | |

FOREIGN PATENT DOCUMENTS

| | | |
|---|---|---|
| CN | 102075219 A | 5/2011 |
| CN | 102299729 A | 12/2011 |
| CN | 102332940 A | 1/2012 |
| CN | 102983890 A | 3/2013 |
| CN | 103297099 A | 9/2013 |
| EP | 1783958 A1 | 5/2007 |
| EP | 1873982 A2 | 1/2008 |
| JP | 2003143326 A | 5/2003 |
| JP | 2005005790 A | 1/2005 |

OTHER PUBLICATIONS

The State Intellectual Property Office of People'S Republic of China, First Search Report, Application No. 201310259412.2, Jan. 14, 2015, 2 pages.

European Patent Office, Extended European Search Report, Application No. 14817751.2, Jan. 30, 2017.

Japan Patent Office, Notification of Reasons for Refusal, Application No. 2016-522228, Feb. 6, 2017, 6 pages.

PCT International Search Report, PCT/CN2014/080863, Sep. 3, 2014, 7 pages.

PCT International Preliminary Report on Patentability, PCT/CN2014/080863, Jan. 7, 2016, 13 pages.

* cited by examiner

BLUETOOTH COMMUNICATION METHOD AND BLUETOOTH COMMUNICATION DEVICE

CROSS-REFERENCE TO RELATED APPLICATION

This application is a National Stage Application under U.S.C. §371 of International Application No. PCT/CN2014/080863, filed Jun. 26, 2014, which claims priority to Chinese Patent Application No. 201310259412.2, filed Jun. 26, 2013, both of which are hereby incorporated by reference in its entireties.

TECHNICAL FIELD

The present disclosure relates to a wireless communication method, and in particular, to a Bluetooth communication method. The present disclosure further relates to a wireless communication device, and in particular, to a Bluetooth communication device.

BACKGROUND

As hardware technologies develop, various mobile devices are influencing people's life. Now, smart phones almost become necessities of people's daily life, mobile Internet Devices (MIDs), small tablet computers and the like are entering the public life, and Bluetooth function almost becomes a standard configuration of the mobile devices. Data transmission between multiple devices may generally be implemented through memory card transmission, Bluetooth transmission and network transmission. The memory card transmission needs inserting and plugging a card; however, some devices do not support external memory cards, and some devices can insert or plug memory cards only after removing batteries. If the data is transmitted through the network, the transmission depends on the network quality, and cannot be conducted in an environment without network, and the transmission time is long when a large size file is transmitted.

The Bluetooth technology is ever developing, and the performance of the Bluetooth device is ever increasing, for example, the power consumption is lowering, and the transmission speed becomes faster. As the updated Bluetooth 4.0 standard is proposed, Bluetooth applications will be broader.

However, the current Bluetooth has a very complicated operation. In a case that the Bluetooth are all opened to be visible, a conventional manner of transmitting a file with Bluetooth is that: a Bluetooth device is needed to enter a Bluetooth interface to search for Bluetooth devices, selects a device to which a file is going to send, performs connection, then confirms that a matching code is correct, and selects a file to send. Likewise, the other party needs the same operation to transmit a file back, and the operation of this manner is too complicated.

As the Bluetooth 4.0 standard is proposed, the Bluetooth power consumption is greatly reduced, and more and more people leave the Bluetooth module in a standby state for a long time; in this way, when searching with the Bluetooth, a large amount of connectable terminals occur. In this case, if a wrong terminal is selected for connection, data safety will be threatened.

Therefore, a method that can implement rapid connection and transmit data through Bluetooth is needed in a mobile device.

SUMMARY

A technical problem to be solved by the present disclosure is to provide a Bluetooth communication method and a Bluetooth communication device, which can perform data transmission through Bluetooth quickly and reliably, and have a convenient and efficient operation process.

To solve the above technical problem, a technical solution of the Bluetooth communication method of the present disclosure is: including a device provided with a Bluetooth module, and sequentially including the following steps:

Step A: renaming the device, so that a name of the device includes a specific character string;

Step B: searching, by a Bluetooth module, another device whose name comprises the same character string or a corresponding character string;

Step C: establishing, by the Bluetooth module, a connection between the device and the searched another device;

Step D: transmitting data with the another device having established the connection; and Step E: disconnecting the Bluetooth connection.

Another technical solution of the Bluetooth communication method of the present disclosure is: including a device provided with a Bluetooth module, and sequentially including the following steps:

Step a: renaming the device, so that a name of the device comprises a specific character string;

Step b: when receiving a request of connection establishment sent by another device whose name comprises the same character string or a corresponding character string, establishing a connection with the another device;

Step c: transmitting data with the another device having established the connection; and Step d: disconnecting the Bluetooth connection.

The present disclosure further provides a Bluetooth communication device, and a technical solution thereof is: including a Bluetooth module, and performing Bluetooth communication by using the foregoing Bluetooth communication method.

By means of the foregoing technical solution, the present disclosure greatly simplifies the operation process of the Bluetooth operation, and improves the operation efficiency of Bluetooth data transmission while ensuring the reliability and safety.

BRIEF DESCRIPTION OF THE DRAWINGS

To illustrate the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE DRAWINGS

Figure 1:
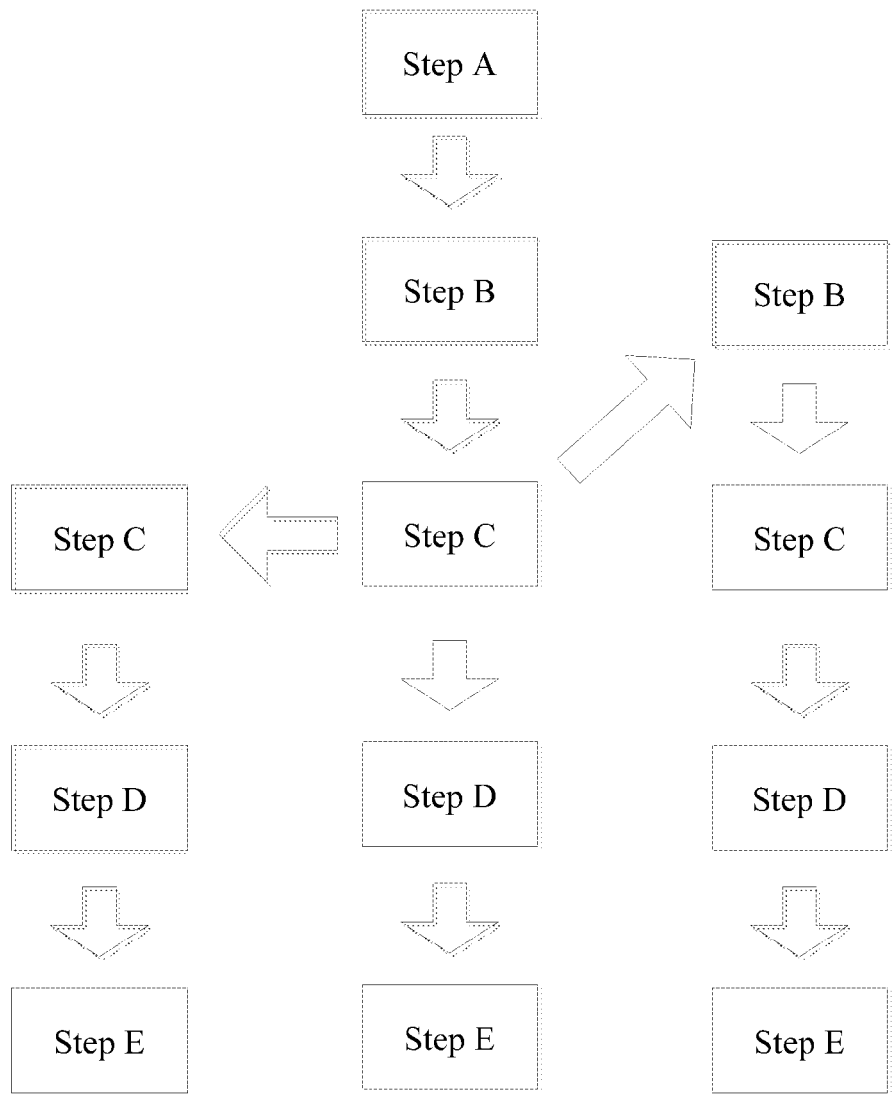
FIG. 1 is a schematic diagram of a technical solution of a Bluetooth communication method according to the present disclosure.

The present disclosure discloses a Bluetooth communication method, including a device provided with a Bluetooth module, and as shown in FIG. 1, sequentially including the following steps:

Step A: Rename the device, so that a name of the device includes a specific character string. When the device is named, the device is named in a system automatic naming manner, or the device is named in a user customizing manner, or the device is named in a manner of combining system automatic naming and user customizing. The manner of renaming is adding the specific character string to an original device name. The added specific character string may be added before the original device name, or added after the original device name, or added at a specific position in the original device name. The renamed name includes the original device name, and therefore, it is more convenient for a user to identify.

Step B: A Bluetooth module searches for another device whose name includes the same character string or a corresponding character string. The same character string or the corresponding character string includes a character string having the same data content, or a character string having the same data format, or a character string having the same data content or the same data format obtained after being processed by a specific algorithm. For example, two devices are respectively named as ABC and DEF. Character strings having the same data content are added to the names to become 123ABC and 123DEF. Or, the current time is added, the time data may be different, but data formats of time are unified, for example, the current time of the device ABC is 12:40:35, the current time of the device DEF is 12:39:28, and their names become 12-40-35ABC and 12-39-28DEF, which include character strings of the same format. Or, data **** and ###### whose content seems to be totally different is added before the names to change the names into **ABC and ######DEF; results having the same data content or the same format can be obtained after **** and ###### are processed by a certain algorithm. The foregoing descriptions are merely some examples, and any data that can find a correspondence in a specific manner can be used for matching.

Step C: The Bluetooth module establishes a connection between the device and the searched another device.

In the Step B and the Step C, other searched devices whose names include the same character strings or corresponding character strings are displayed in a list, and the user selects to establish a connection with one or more of them. Or, if only one other device whose name includes the same character string or corresponding character string is found within a period of time, a connection is established automatically with the other device.

Step D: Data transmission is performed with the another device having established the connection. A manner of data transmission is single-way data transmission from one device to another device, or a two-way data transmission between two devices.

In the Step B and Step C, if a plurality of other devices whose names include the same character strings or corresponding character strings is searched, and connections are not established with all the other devices in the Step C, after the Step C, the user selects whether to establish a connection with another device that is not connected, and if the user selects yes, the Step C and subsequent steps are performed again at the same time.

After the Step C, the Step B and the subsequent steps are repeated. In other words, at the same time the another device is connected for data transmission, steps such as searching for another device having the name comprising the same character string or corresponding character string, establishing a connection and transmitting data are repeated. In this way, the device can communication with a plurality of other devices at the same time.

Step E: The Bluetooth connection is disconnected.

After the Step E, the name of the device is restored.

Figure 2:
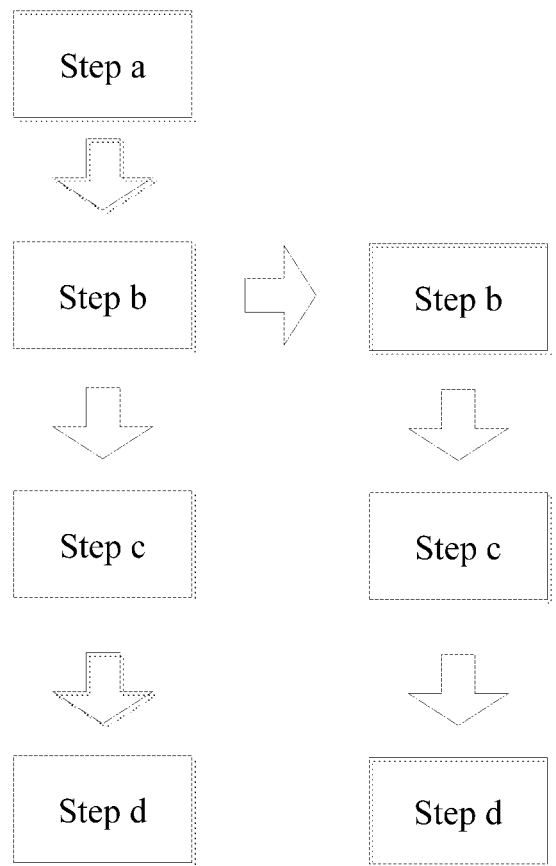
FIG. 2 is a schematic diagram of another technical solution of a Bluetooth communication method according to the present disclosure.

The present disclosure further discloses another Bluetooth communication method, including a device provided with a Bluetooth module, and as shown in FIG. 2, sequentially including the following steps:

Step a: Rename the device, so that a name of the device includes a specific character string. When the device is named, the device is named in a system automatic naming manner, or the device is named in a user customizing manner, or the device is named in a manner of combining system automatic naming and user customizing. The manner of renaming is adding the specific character string to an original device name.

The same character string or the corresponding character string includes a character string having the same data content, or a character string having the same data format, or a character string having the same data content or the same data format obtained after being processed by a specific algorithm.

Step b: When receiving a request of connection establishment sent by another device whose name includes the same character string or a corresponding character string, a connection is established with the another device.

When another device whose name includes the same character string or corresponding character string sends the request of connection establishment, the another device is displayed, and the user determines whether to agree to establish the connection. Or, when another device whose name includes the same character string or corresponding character string sends the request of connection establishment, the device automatically establishes a connection with the another device.

Step c: Data transmission is performed with the another device having established the connection. A manner of data transmission is single-way data transmission from one device to another device, or a two-way data transmission between two devices.

After the Step b, the Step b and the subsequent steps are repeated. In other words, at the same time the another device is connected for data transmission, steps such as responding to search information of another device whose name includes the same character string or corresponding character string, establishing a connection and transmitting data are repeated.

Step d: The Bluetooth connection is disconnected.

After the Step d, the name of the device is restored.

The present disclosure further discloses a Bluetooth communication device, including a Bluetooth module, and the Bluetooth communication device performs Bluetooth communication by using the foregoing Bluetooth communication method.

When the user performs searching with Bluetooth, a plurality of other devices may be searched. In the present disclosure, by modifying the name of the Bluetooth device, many unrelated devices may be filtered out, for example, specific character strings are added at names of a specific crowd, and in this way, only devices having the character strings can be selected by searching to establish connections manually or automatically, thereby improving the operation efficiency and accuracy of Bluetooth transmission.

The method of the present disclosure is used for rapid data exchange between multiple users when Bluetooth of devices are all opened to be visible.

The Bluetooth communication device may be named by the device automatically, or named in a user customizing manner, or the device may be named in a manner of combining user customizing and device automatic naming. The foregoing naming manner may be adding a special identity verification character before an original device name.

The user selects data to be sent or interacted.

In a process of Bluetooth searching, the identity verification character in the device name may be verified to determine that it is an object of data exchange;

Another device is searched for through the Bluetooth, and a server end SOCKET is established to monitor a designated port, so as to wait for the another device to connect;

When devices meeting the identity verification are found, device names are displayed in an exchangeable data device list;

When the user selects a device, or there is only one device in the device list, a Bluetooth MAC address of the device is acquired, and a connection request is sent to the server end SOCKET according to the address and a port number designated before; and After the server end SOCKET receives the connection request and confirms the connection, the server end SOCKET may continue to monitor a new connection; both parties of the connection acquire a SOCKET connection output flow to write data, and also monitor a connection input flow.

During data writing, a segment of check bits will be added before each segment of data, including information such as a data length and a type, and after the data is written, a segment of tail end identification information is added at the end of the data. During data reading, check information is read first, data content is acquired according to the information and the data is combined, and the reading stops when the tail end identification is read.

The user is prompted of completing of the sending, and the received data is displayed.

By means of the foregoing method, the present disclosure may implement the following advantages compared with the prior art.

The user does not need to conduct complicated operations such as manual searching, selecting a device and confirming matching, and only needs a simple click to send.

Data sending and data receiving are performed at the same time, and therefore, one party no longer needs to send data and then receive data sent by the other party, thereby improving the efficiency of data exchange.

Data exchange of more than two persons may be implemented. Any device in the exchangeable device list is selected and then data exchange may be performed; moreover, exchange with multiple devices may be performed at the same time.

The foregoing descriptions are merely preferred embodiments of the present disclosure, and are not intended to limit the essential technical content scope of the present disclosure. The essential technical content of the present disclosure is defined by the applied claims, and any technical entity or method implemented by others is an equivalent variation if it is completely the same as that defined by the claims, and shall fall within the scope of the claims.

What is claimed is:

1. A Bluetooth communication method, comprising:
    Step A: renaming a device including a Bluetooth module, so that a name of the device comprises a character string;
    Step B: searching, by the Bluetooth module, for a second device whose name comprises the same character string or a corresponding character string;
    Step C: establishing, by the Bluetooth module, a connection between the device and the second device;
    Step D: transmitting data with the second device having established the connection; and
    Step E: disconnecting the connection.

2. The Bluetooth communication method according to claim 1, wherein in the Step A, the device is named in a system automatic naming manner, or the device is named in a user customizing manner, or the device is named in a manner of combining system automatic naming and user customizing.

3. The Bluetooth communication method according to claim 1, wherein the Step A comprises adding the character string to an original device name.

4. The Bluetooth communication method according to claim 1, wherein the same character string or corresponding character string comprises a character string having the same data content, or a character string having the same data format, or a character string having the same data content or the same data format obtained after being processed by a specific algorithm.

5. The Bluetooth communication method according to claim 1, further comprising:
    displaying the second device whose names comprise the same character strings or corresponding character strings in a list so that a user selects whether to establish a connection with the second device.

6. The Bluetooth communication method according to claim 1, further comprising:
    when only one device whose name comprises the same character string or corresponding character string is found within a period of time, automatically connection is establish a connection with the one device.

7. The Bluetooth communication method according to claim 1, further comprising:
    when multiple devices whose names comprising the same character strings or corresponding character strings are found, and connections are not established with all the multiple devices in the Step C, after the Step C, providing one or more options for a user to select whether to establish a connection with one or more the multiple devices that are not connected, and when the user selects yes, repeating the Step C and subsequent steps.

8. The Bluetooth communication method according to claim 1, further comprising: after the Step C, repeating the Step B and the subsequent steps.

9. The Bluetooth communication method according to claim 1, wherein in the Step D, a manner of data transmission is single-way data transmission from the device to the second device, or a two-way data transmission between two devices.

10. The Bluetooth communication method according to claim 1, further comprising: restoring the name of the device after disconnecting the connection.

11. A Bluetooth communication method, comprising:
    Step a: renaming a device including a Bluetooth module, so that a name of the device comprises a character string;
    Step b: when receiving a request of connection establishment sent by a second device whose name comprises the same character string or a corresponding character string, establishing a connection with the second device;

Step c: transmitting data with the second device having established the connection; and Step d: disconnecting the connection.

12. The Bluetooth communication method according to claim 11, wherein in the Step a, the device is named in a system automatic naming manner, or the device is named in a user customizing manner, or the device is named in a manner of combining system automatic naming and user customizing.

13. The Bluetooth communication method according to claim 11, wherein the Step a comprises adding the character string to an original device name.

14. The Bluetooth communication method according to claim 11, wherein the same character string or the corresponding character string comprises a character string having the same data content, or a character string having the same data format, or a character string having the same data content or the same data format obtained after being processed by a specific algorithm.

15. The Bluetooth communication method according to claim 11, further comprising:

when the second device whose name comprises the same character string or corresponding character string sends the request of connection establishment, displaying the second device so that a user determines whether to agree to establish the connection.

16. The Bluetooth communication method according to claim 11, further comprising:

when the second device whose name comprises the same character string or corresponding character string sends the request of connection establishment, automatically establishing a connection with the second device.

17. The Bluetooth communication method according to claim 11, further comprising: after the Step b, repeating the Step b and the subsequent steps.

18. The Bluetooth communication method according to claim 11, wherein in the Step c, a manner of data transmission is single-way data transmission from the device to the second device, or a two-way data transmission between two devices.

19. The Bluetooth communication method according to claim 11, further comprising restoring the name of the device after disconnecting the connection.

20. A device comprising a Bluetooth module, wherein the device performs acts comprising:

Step A: renaming a device including a Bluetooth module, so that a name of the device comprises a character string;

Step B: searching, by the Bluetooth module, for a second device whose name comprises the same character string or a corresponding character string;

Step C: establishing, by the Bluetooth module, a connection between the device and the second device;

Step D: transmitting data with the second device having established the connection; and Step E: disconnecting the connection.

* * * * *